(12) United States Patent
Tambornino (10) Patent No.: US 8,079,612 B1
(45) Date of Patent: Dec. 20, 2011

(54) TRAILER HITCH RECEIVER TUBE HAVING END NOTCH AND LIP

(76) Inventor: Curt Tambornino, Eau Claire, WI (US)

( * ) Notice: Subject to any disclaimer, the term of this patent is extended or adjusted under 35 U.S.C. 154(b) by 998 days.

(21) Appl. No.: 11/677,667

(22) Filed: Feb. 22, 2007

Related U.S. Application Data (60) Provisional application No. 60/824,127, filed on Aug. 31, 2006.

(51) Int. Cl.
*B60D 1/36* (2006.01)
(52) U.S. Cl. ............. 280/506; 280/491.5; 224/519
(58) Field of Classification Search ............ 280/506, 280/491.2, 491.5, 491.1, 507; 224/519, 532; 224/521, 537; 403/383, 13, 109.1
See application file for complete search history.

(56) References Cited

U.S. PATENT DOCUMENTS

| | | | | |
|---|---|---|---|---|
| 2,503,738 A * | 4/1950 | Horton | ........................... | 403/362 |
| 3,630,321 A | 12/1971 | Hollnagel | | |
| 4,040,641 A | 8/1977 | Riecke | | |
| 4,050,714 A | 9/1977 | Epp | | |
| 4,540,138 A * | 9/1985 | Gutschmit | .................. | 242/131 |
| 4,603,878 A * | 8/1986 | Smith, Jr. | ................... | 280/479.2 |
| 4,744,690 A * | 5/1988 | Hsieh | .......................... | 403/104 |
| 4,932,638 A * | 6/1990 | Chen | ................................ | 269/6 |
| 5,184,840 A | 2/1993 | Edwards | | |
| 5,203,194 A * | 4/1993 | Marquardt | ...................... | 72/316 |
| 5,535,644 A * | 7/1996 | Paul-Alexandre et al. | .... | 81/3.09 |
| 5,593,172 A | 1/1997 | Breslin | | |
| 5,615,904 A | 4/1997 | Van Dusen et al. | | |
| 5,620,198 A | 4/1997 | Borchers | | |
| 5,727,805 A * | 3/1998 | La Roque | ................... | 280/478.1 |
| 5,873,595 A * | 2/1999 | Hinte | ........................... | 280/504 |
| 5,879,102 A | 3/1999 | Koliopoulos | | |
| 5,921,049 A * | 7/1999 | Sugiyama | ..................... | 52/653.1 |
| 5,957,477 A * | 9/1999 | Ensz et al. | .................... | 280/482 |
| 6,010,144 A | 1/2000 | Breslin | | |
| 6,019,386 A * | 2/2000 | Morelock | ..................... | 280/507 |
| 6,105,989 A * | 8/2000 | Linger | .......................... | 280/506 |
| 6,336,580 B1 * | 1/2002 | Allen et al. | .................... | 224/532 |
| 6,409,203 B1 | 6/2002 | Williams | | |
| 6,502,845 B1 * | 1/2003 | Van Vleet | .................. | 280/491.1 |
| 6,609,725 B1 | 8/2003 | Williams | | |
| 6,820,890 B2 * | 11/2004 | Westerdale | ................... | 280/507 |
| 6,910,705 B1 * | 6/2005 | Harwood et al. | ............. | 280/507 |
| 6,948,732 B2 * | 9/2005 | Amacker | ................... | 280/415.1 |
| 7,004,491 B1 * | 2/2006 | Allsop et al. | ................. | 280/506 |
| 7,390,007 B2 * | 6/2008 | Helms et al. | ................. | 280/491.4 |
| 7,455,313 B2 * | 11/2008 | Yokosh et al. | ................ | 280/507 |
| 7,467,804 B2 * | 12/2008 | Ezra | ............................. | 280/506 |

* cited by examiner

*Primary Examiner* — Joanne Silbermann
*Assistant Examiner* — Maurice Williams
(74) *Attorney, Agent, or Firm* — Anthony J. Bourget (57) ABSTRACT

A trailer hitch receiver tube comprising a hollow tubular member adapted to receive a hitch bar, the tubular member including a free end, the free end defining a notch. The tube may be fitted with a lip to create a receiver box. The lip includes a tab which is positioned within the notch and accommodates tightening of an inserted bar within the tube cavity.

11 Claims, 7 Drawing Sheets

TRAILER HITCH RECEIVER TUBE HAVING END NOTCH AND LIP

CROSS-REFERENCE TO RELATED APPLICATIONS, IF ANY

Applicant claims priority based on Provisional Patent Application No. 60/824,127, filed Aug. 31, 2006.

BACKGROUND OF THE INVENTION

1. Field of the Invention

The present invention relates generally to trailer hitch receiver tubes, receiver boxes, and lips for attachment to the same, and particularly to devices that minimize the relative movement between the receiver tube and a hitch bar or insert within the tube.

2. Background Information

There are a variety of securing devices for receiver hitches including anti-rattle devices and stabilizing devices. A typical device includes use of a collar component with an adjustment bolt or other type of mechanism to secure to the receiver tube. Most if not all such devices concern components that attach to the receiver tube or to a receiver box (a receiver box is a tube that contains a lip). There have been few, if any, alternative designs to the standard receiver tube or receiver box to accommodate for an anti-rattle or stabilizing device. Applicant has focused primarily on making modification to the receiver tube (and to the lip) to accomplish the desired results. The present invention provides a novel receiver tube, receiver box, and lip for use with a tube or box, that presents advantages over prior designs.

SUMMARY OF THE INVENTION

The present invention is directed toward a trailer hitch receiver box comprising a trailer hitch receiver tube adapted to receive a hitch bar and having a notch, and a lip mounted to the receiver tube, the lip having a tab positioned within the notch.

Non-limiting additional features of the invention include where the lip may be mounted to the receiver tube in a variety of ways, and may be welded to an end of the receiver tube. The tab may include a threaded bore to receive a fastener to apply force to the hitch bar inserted within the receiver box to stabilize the hitch bar and prevent rattle.

A further aspect of the invention includes a trailer hitch receiver box comprising a trailer hitch receiver tube adapted to receive a hitch bar within a hitch bar receiving cavity; and a lip welded to the receiver tube about an end of the tube, the lip having a shoulder defining a bore, the bore in communication with the hitch bar receiving cavity.

Non-limiting additional features of the invention include where the tube may include a notch and the bore may include threads to receive a bolt within the bore and within the notch. At least a portion of the shoulder may be positioned within the notch.

A further aspect of the invention includes a trailer hitch receiver tube comprising a hollow tubular member adapted to receive a hitch bar, the tubular member including a free end, the free end defining a notch.

Non-limiting additional features of the invention include where the tube may include a pin aperture where the pin aperture and the notch are positioned on a common side of the tube. In one aspect the tube has at least four sides with edges, and at least a portion of one of the edges is off-set from a plane defined by at least two of the other edges.

A further aspect of the invention includes a lip for attachment to a free end of a trailer hitch receiver tube having a receiver tube cavity, the lip comprising a body member including four segments, at least three of the segments having a facing portion defining an opening to the receiver tube cavity and a shoulder, at least a portion of at least one of the segments being substantially rectangular in section, the at least one of the segments defining a bore therethrough.

A further aspect of the invention includes a lip for attachment to a free end of a trailer hitch receiver tube having a receiver tube cavity, the lip comprising a body member including four segments each having opposite ends connected to ends of adjacent segments such that the segments cooperate to define a rectangular opening, each segment having a shoulder, at least a portion of one of the shoulders having a thickness greater than a thickness of a shoulder of at least one of the adjacent segments, the at least a portion defining a bore therethrough.

The above summary of the present invention is not intended to describe each illustrated embodiment, aspect, or every implementation of the present invention. The figures and detailed description and claims that follow more particularly exemplify these and other embodiments and further aspects of the invention.

BRIEF DESCRIPTION OF THE DRAWINGS

The invention may be more completely understood in consideration of the following description of various embodiments of the invention in connection with the accompanying drawings, in which.

While the invention is amenable to various modifications and alternative forms, specifics thereof have been shown by way of example in the drawings and will be described in detail. It should be understood, however, that the intention is not necessarily to limit the invention to the particular embodiments, aspects and features described. On the contrary, the intention is to cover all modifications, equivalents, and alternatives falling within the spirit and scope of the invention and as defined by the appended claims.

DETAILED DESCRIPTION OF THE INVENTION

Referring now to the Figures, a receiver box according to the present invention is generally depicted with reference to numeral 20. In one aspect, box 20 includes a trailer hitch receiver tube 22, and a lip 24.

Tube 22 includes a hollow tubular member 23 which contains features generally of a type known in the hitch industry. Tubular member 23 is adapted to receive a hitch bar (hitch bar not shown). Tubular member 23 may be made of shaped steel and typically includes four sides 30a, 30b, 30c, and 30d. Sides 30 are typically aligned perpendicularly as shown. It may be appreciated that other arrangements and shapes may be possible, yet the shown arrangement is typical and most commonly used in the hitch industry. Tube 22 preferably has a rectangular cross section and more preferably a square cross section including inner and outer surfaces 31 and 33. Tubular member 23 includes a free end 32 which defines a notch 26. Notch 26 is positioned at a terminal end 34 of the free end 32. In one aspect, terminal end 34 includes a terminal edge 35 which is substantially U-shaped in section.

Figure 1:
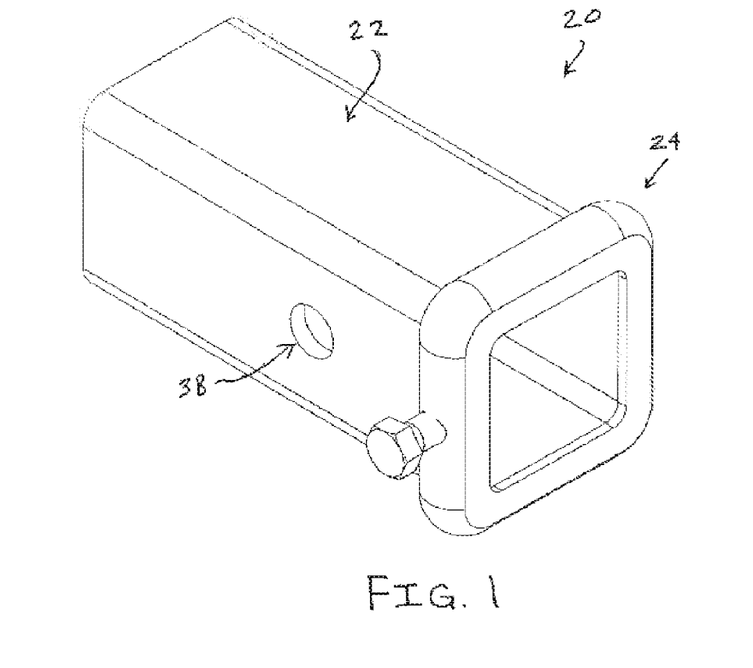
FIG. 1 is a perspective view of trailer hitch receiver box in accordance with one aspect of the present invention.
Figure 2:
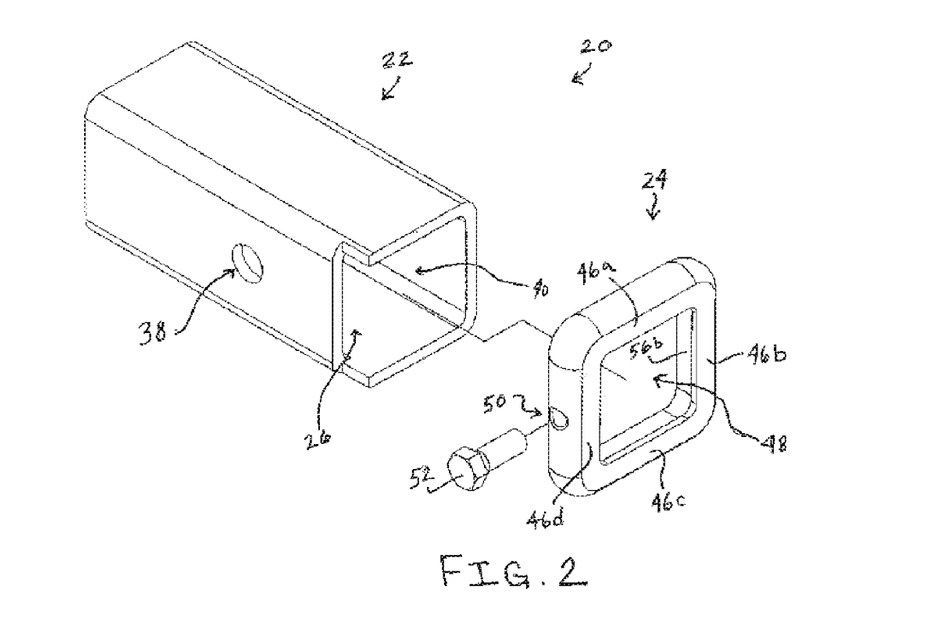
FIG. 2 is an exploded perspective view of the receiver box of FIG. 1.
Figure 3:
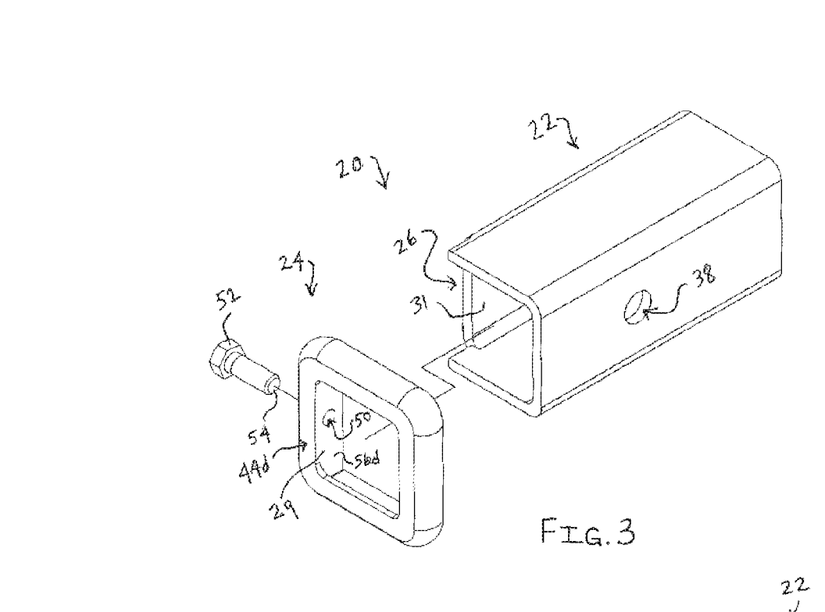
FIG. 3 is a reverse view of the receiver box of FIG. 2.
Figure 4:
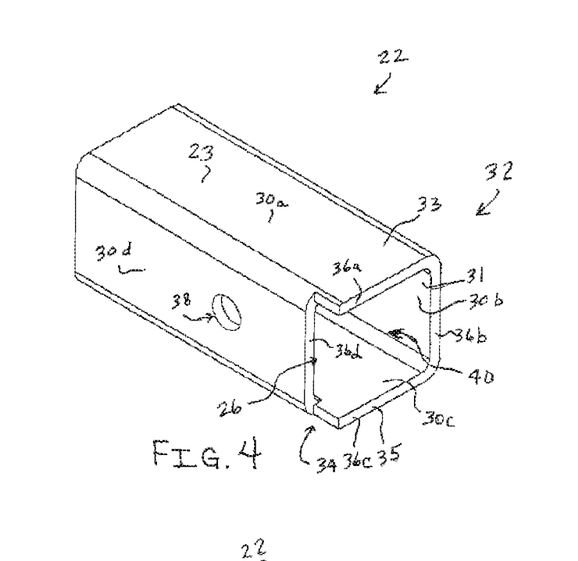
FIG. 4 is a perspective view of a trailer hitch receiver tube in accordance with a further aspect of the present invention.

In one aspect, each of the sides 30 includes a respective edge 36a, 36b, 36c, and 36d. Edges 36 extend between inner and outer surfaces 31, 33 and face rearwardly with respect to an associated vehicle upon mounting thereon in any suitable manner. At least two of edges 36, and preferably three of edges 36, generally define a plane. As may be appreciated with reference to FIG. 4, edges 36a and 36c generally define a plane. At least one of the four sides 30 has an edge, for example, edge 36d, where at least a portion of the edge 36d is off-set from the plane defined by at least two of the other edges, for example edge 36a and 36c. This off-set arrangement defines notch 26 in this aspect. The use of notch 26 is described in greater detail below.

It may be appreciated that each of the four sides 30 has a length, and that at least a portion of one of the sides 30d may have a length "t" which is shorter than the length "u" of at least two of the other sides, 30a, 30c. Having such shortened length arrangement alternatively defines notch 26.

Figure 14:
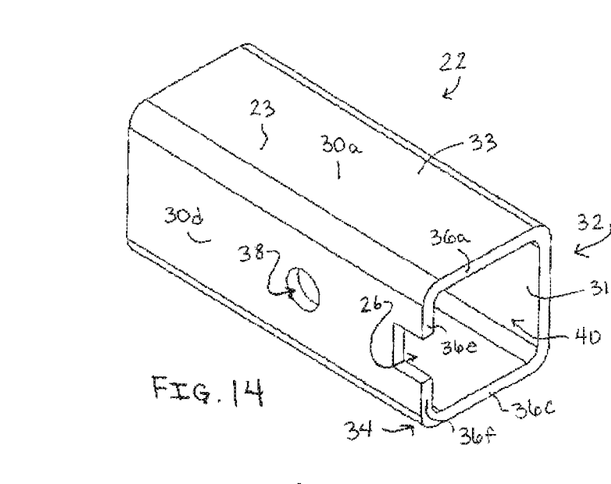
FIG. 14 is a perspective view of a further aspect of a receiver tube of the present invention.
Figure 15:
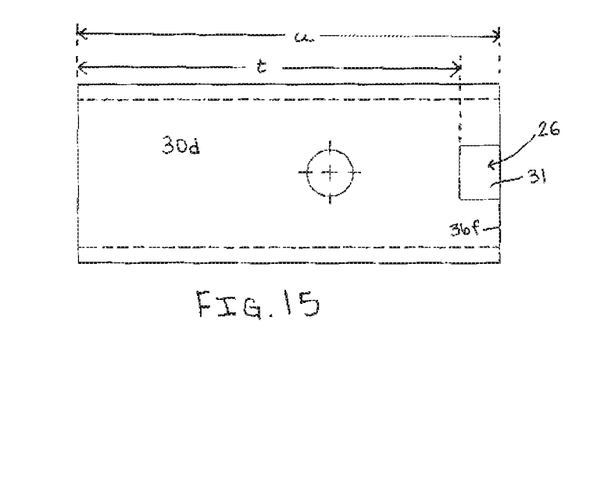
FIG. 15 is an elevation view of the tube of FIG. 14.
Figure 16:
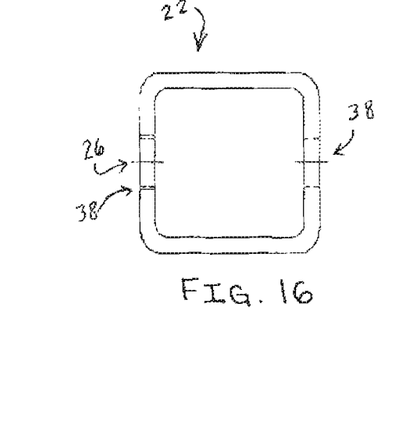
FIG. 16 is an end view of the tube of FIG. 14.

A further aspect of notch 26 is shown in FIG. 14, where edge 36d spans less than the entire width of side 30d. It may be appreciated that side 30d may include edges 36e and 36f. Edges 36e and 36f may be of varying dimension to provide a notch 26 of greater or lesser width as desired.

In fabricating tube 22, notch 26 may be cut-out or stamped from tube member 23. It may be appreciated that removal of material from free end 32 may be accomplished in any number of non-limiting methods in order to create notch 26. It is preferable, however, that notch 26 be positioned at a terminal end 34 of tube 23. It may be appreciated that notch 26 may be formed upon bending of sides 30 such that a side 30d having a shorter relative length as compared to other sides 30a, 30b, or 30c results in tube 23 having a desired notch 26. Notch 26 may be stamped from side 30 when tubular member is in a flat state and before bending into tubular form. Alternatively, notch 26 is cut or punched or otherwise removed from a tubular member 23 of standard stock variety. Multiple treatments of tubular member 23 may be needed as desired. A single punch or cut of notch 26 may be accomplished as is shown by notch 26 of FIG. 14, for instance. It may be appreciated that notch 26 may be provided without deformity of tube 23 and without deformity of terminal end 34. It may be appreciated that notch 26 may be positioned at a variety of locations about terminal end 34, and is preferably centered at one of sides 30 such as at 30d as shown. It may also be appreciated that notch 26 may vary in length and width as desired. Preferably notch 26 has a depth that is generally similar to a thickness of lip 24 as described further below.

Tube 22 includes pin aperture 38 which is adapted to receive a holding pin (pin not shown) which inserts through tube 22 and through an inserted hitch bar as is commonly used in the hitch industry. It may be appreciated that a hitch bar may be inserted into hitch bar receiving cavity 40 defined by tube 22. Preferably tube 22 includes a pair of apertures 38 defined on opposing sides. Preferably aperture 38 is defined on a side 30d in which notch 26 is also defined. It may be appreciated, however, that notch 26 may be defined on a side 30 which also does not include aperture 38.

Referring to FIGS. 1-3, and FIGS. 7-10, lip 24 includes a body member 42 having four segments 44a, 44b, 44c, and 44d. Segments 44 include respective facing portions 46a, 46b, 46c, and 46d which generally define lip opening 48 to the hitch bar receiving cavity 40. Segments 44 also include respective shoulders 56a, 56b, 56 c, and 56d.

Lip 24 includes tab 28. As shown in FIGS. 1-4, where lip 24 is assembled together with tube 22, tab 28 is positioned within notch 26. Lip 24 may be welded to tube 22. Preferably tab 28 includes an inner surface 29 such that when lip 24 is assembled with tube 22, inner surface 29 is flush with tube inner surface 31. Such arrangement preferably provides an uninterrupted contour between lip 24 and tube 22 and accommodates smooth insertion of a receiver bar within tube 22. As shown in FIGS. 11-22, further aspects of the invention are shown where an alternative lip 24 and notch 26 may be provided as desired. It may be appreciated that any variety and multiple lip and notch configurations may be utilized under the present invention. Preferably notch 26 is positioned at a terminal edge 34 of tube 22.

Figure 5:
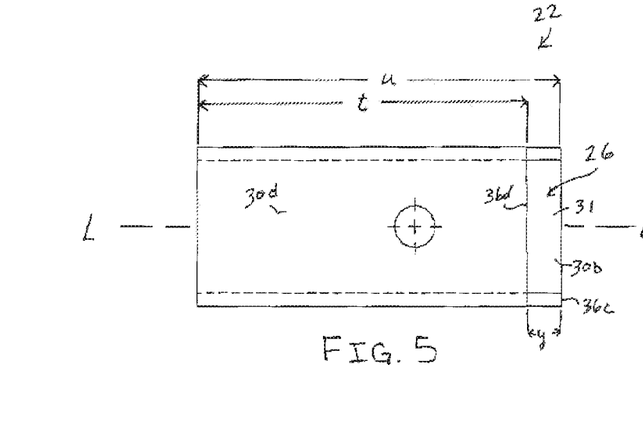
FIG. 5 is an elevation view of the tube of FIG. 4.
Figure 6:
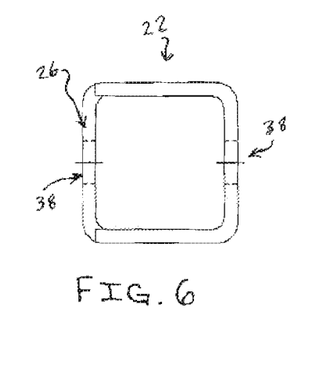
FIG. 6 is an end view of the tube of FIG. 4.
Figure 7:
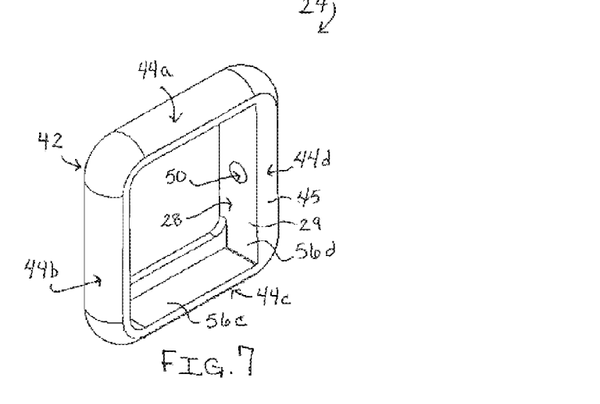
FIG. 7 is a perspective view of a lip for use with a receiver tube in accordance with a further aspect of the present invention.
Figure 8:
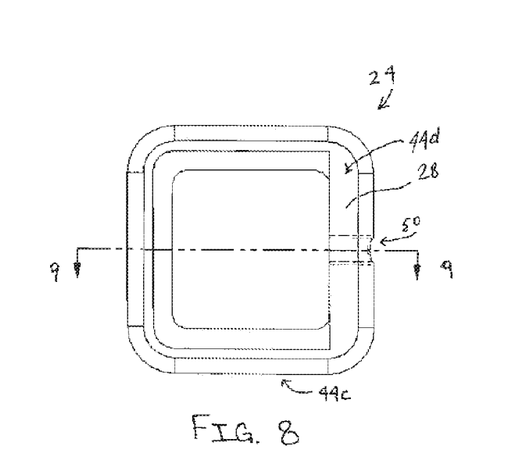
FIG. 8 is a rear elevation view of the lip of FIG. 7.
Figure 9:
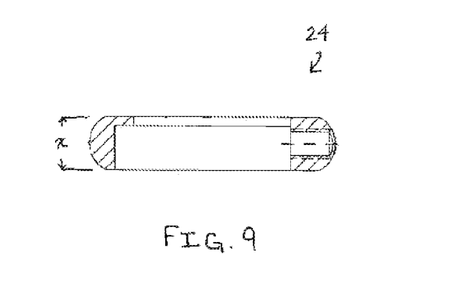
FIG. 9 is a section view of a lip taken along line 9-9 of FIG. 8.
Figure 10:
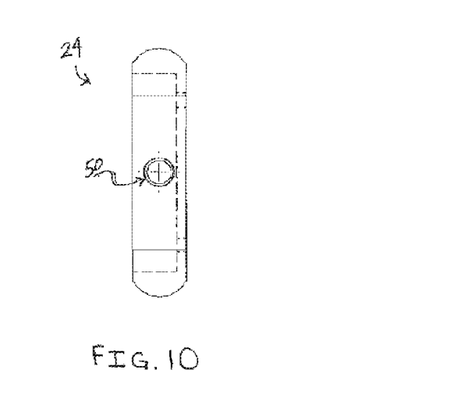
FIG. 10 is a side view of the lip of FIG. 7.
Figure 11:
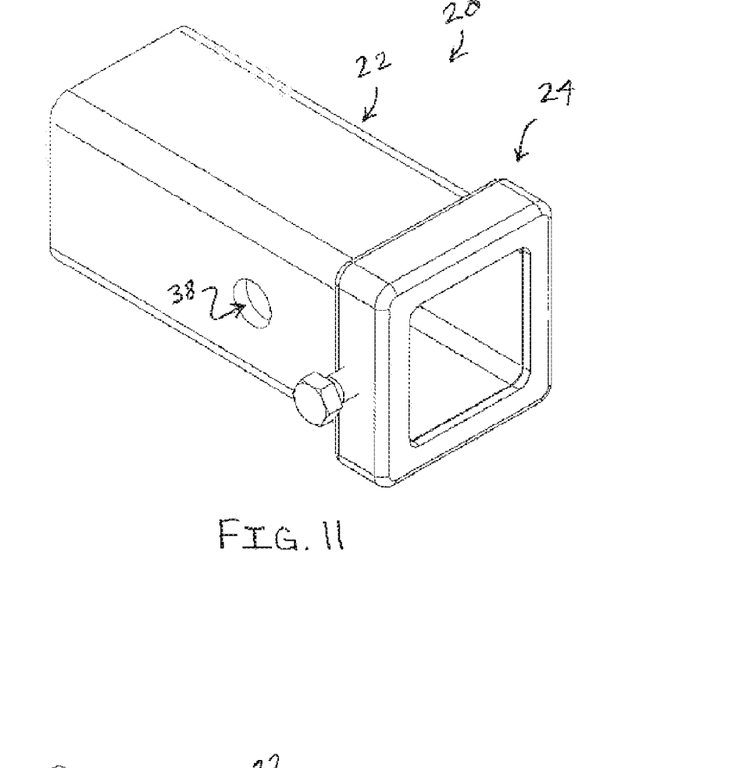
FIG. 11 is a perspective view of a further aspect of a receiver box in accordance with the present invention.
Figure 12:
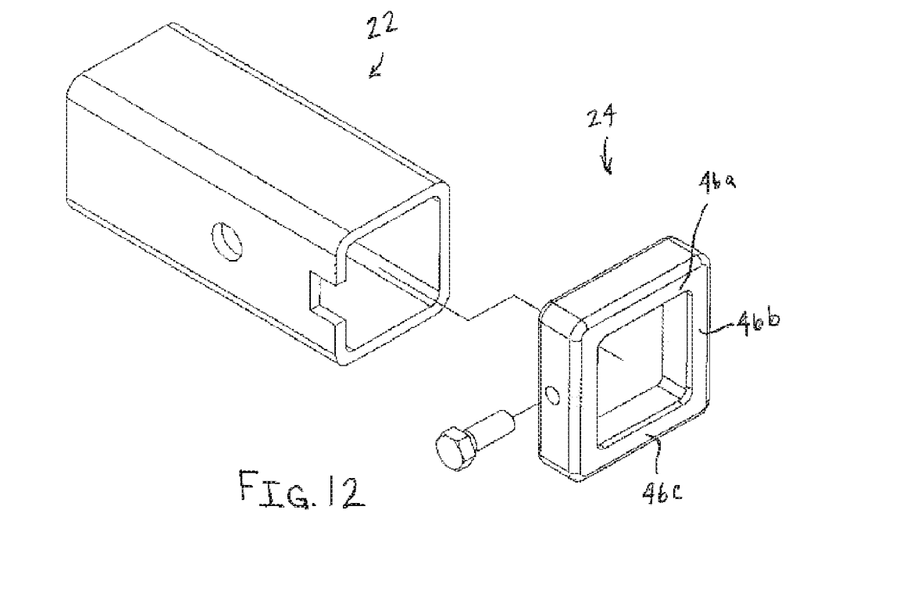
FIG. 12 is an exploded perspective view of a further aspect of a receiver box in accordance with the present invention.
Figure 13:
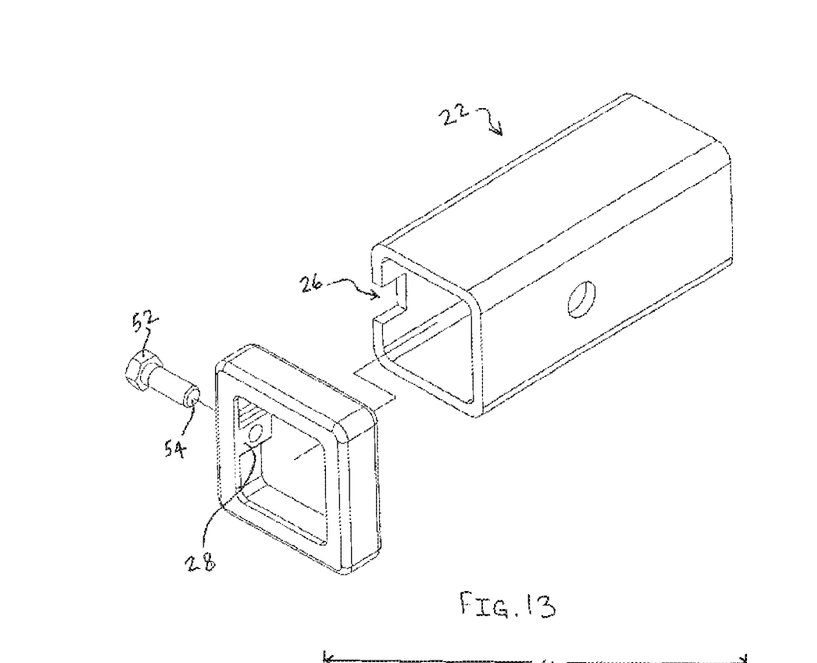
FIG. 13 is a reverse view of the receiver box of FIG. 12.
Figure 17:
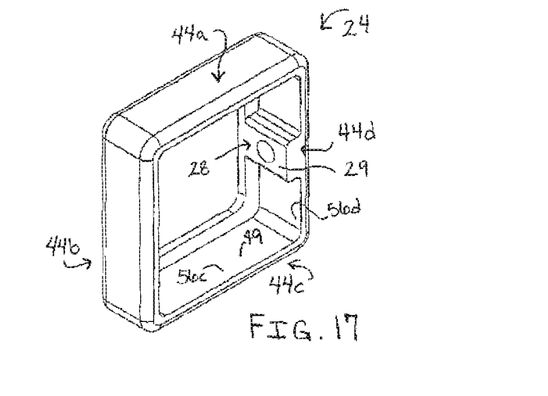
FIG. 17 is a perspective view of a further aspect of a lip of the present invention.
Figure 18:
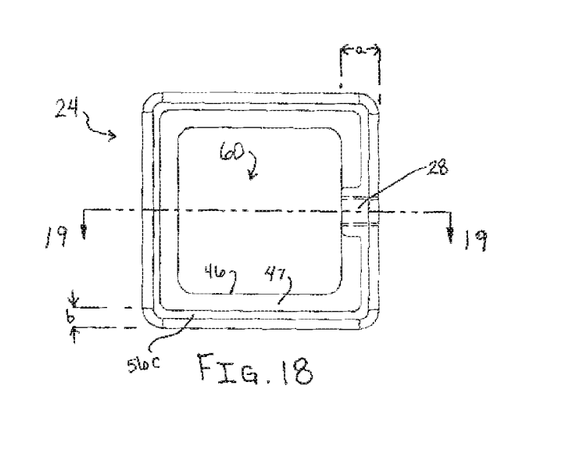
FIG. 18 is a rear view of the lip of FIG. 17.
Figure 19:
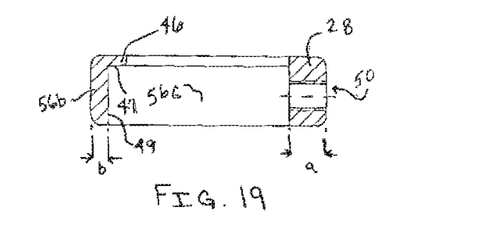
FIG. 19 is a section view taken along line 19-19 of FIG. 18.
Figure 20:
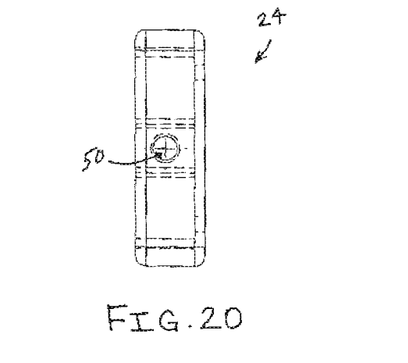
FIG. 20 is a side view of the lip of FIG. 17.
Figure 21:
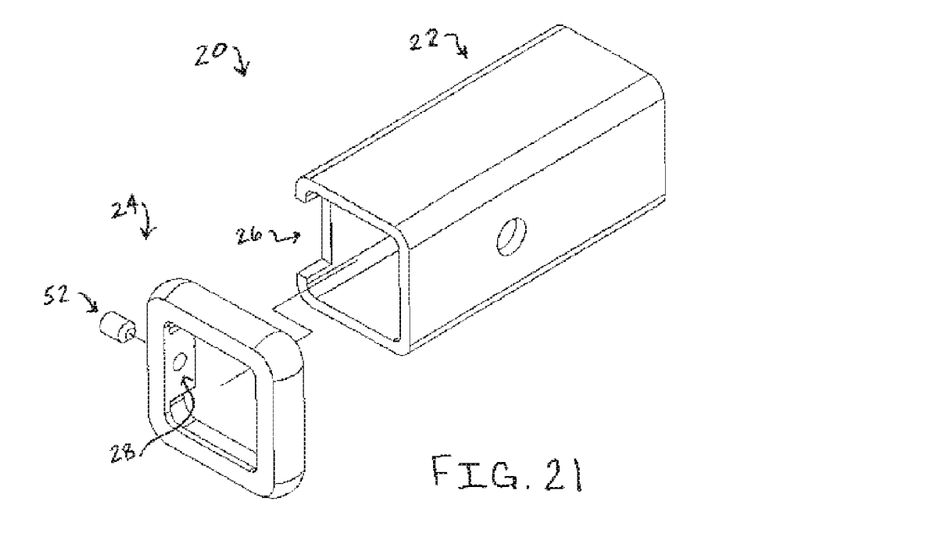
FIG. 21 is an exploded perspective view of a further aspect of a receiver box in accordance with the present invention.
Figure 22:
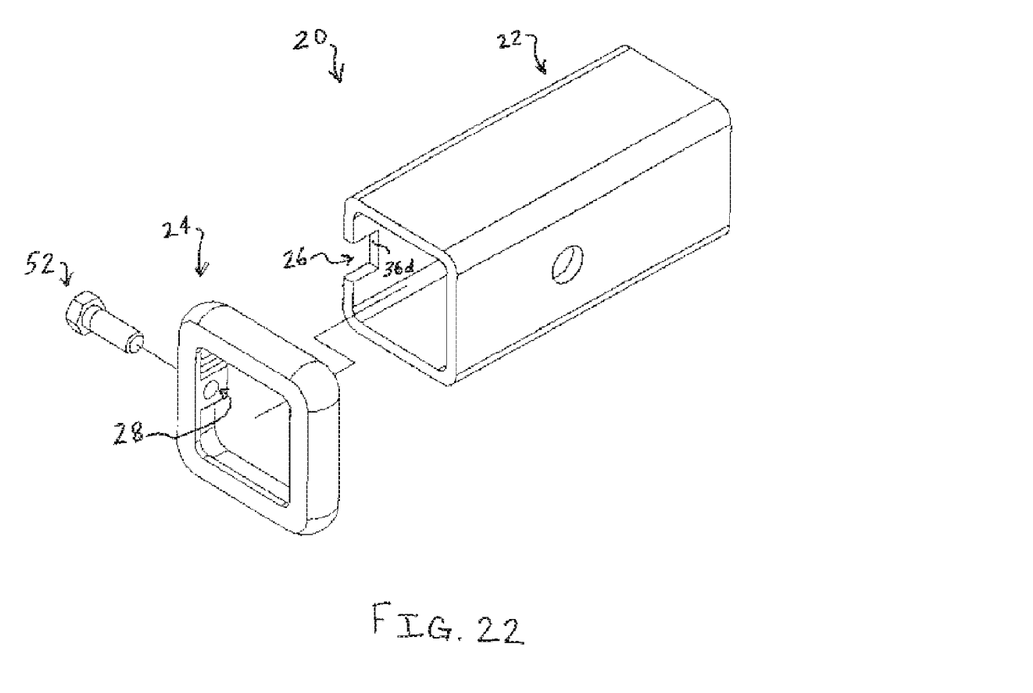
FIG. 22 is an exploded perspective view of a further aspect of a receiver box in accordance with the present invention.

When lip 24 is assembled with tube 22, the inner surface 49 of shoulders 56 of lip 24, or some of them, preferably abut outer surface 33 of tube 22. Lip segment surface 45 may abut edge 36, such as at edge 36d. It may be appreciated that at least some of the segments 44 may be L-shaped in section. It may be further appreciated that at least one segment 44d may be other than L-shaped in section. For instance, at least one segment 44d may be generally rectangular shaped in section. It may also be appreciated, for instance as shown in FIG. 17, that at least a portion (i.e., at tab 28) of at least one segment, such as segment 44d, may be generally rectangular in section, while other portions of the segment 44d may be generally L-shaped in section. Preferably lip 24 has a width "x" (FIG. 9) which is substantially equal to a depth "y" (FIG. 5) of notch 26.

Tab 28 includes bore 50, and preferably a threaded bore. A fastener 52, such as an optional bolt, preferably threaded, may be inserted into bore 50. In operation, a hitch bar (not shown) may be inserted into hitch bar receiving cavity 40 so that the bolt or fastener 52 may be tightened to secure the hitch bar within receiver box 20. Particularly, fastener 52 applies force against hitch bar at fastener end 54. Such force causes hitch bar to press firmly against inner surface 31 which stabilizes the hitch bar and reduces or prevents wobble and/or rattle. Bore 50 having a length of threads allows a user to firmly tighten fastener 52 to secure the hitch bar and prevent rattle and promote stability. It may be appreciated that the greater the thickness of tab 28, the greater the length of threads, which in turn increases the ability to obtain a strong securing force while at the same time lessening the possibility of stripping of the threads. It may be appreciated that shoulder 56*d* defines bore 50. Preferably bore 50 is in communication with cavity 40. It may be appreciated that shoulder 56*d* comprises a perimeter edge of lip 24. It may also be appreciated that bore 50 is aligned generally orthogonal to a longitudinal axis L running through cavity 40. In assembly, lip 24 covers at least a portion of perimeter edge 36 of tube 22.

Lip body 42 may include four segments 44 each having opposite ends connected to ends of adjacent segments 44 such that the segments 44 cooperate to define a rectangular opening 48. In one aspect of the invention, and referring to FIG. 17 and FIG. 18, segments 44 include shoulders 56. Preferably, at least a portion of one of shoulders 44*d* (i.e., at tab 28) has a thickness "a" greater than a thickness "b" of at least one of the adjacent segments 44. Tab 28 projects toward a center area 60 of lip 24. Segments 44 include shoulders 56 and facing portions 46 in a generally L-shaped cross section. When lip 24 is assembled with tube 22, the inside surface 47 of facing portion 46 of lip 24, or some of them, preferably abut edge 36 of tube 22. Alternatively surface 47 may avoid contact with edge 36. A powder coating may be introduced to any gap created thereby.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise specifically indicated.

What is claimed is:

1. A trailer hitch receiver box comprising:
    a trailer hitch receiver tube having four sides arranged generally perpendicularly with adjacent said sides and adapted to receive a hitch bar and defining a notch therein, said notch positioned at a terminal end of said tube; and
    a lip mounted to said receiver tube, said lip having a tab positioned within said notch; and
    where said notch is defined within one of said sides and where access to a hitch bar receiving cavity of said tube may be made through said notch.

2. The receiver box of claim 1 where said lip is mounted at least in part to an outside of said tube.

3. The receiver box of claim 1 wherein said tab includes a threaded bore.

4. The receiver box of claim 1 wherein said lip includes a body member including four segments, at least three of said segments including a facing portion defining an opening to a cavity defined by said receiver tube and a shoulder.

5. The receiver box of claim 4 wherein at least one of said four segments includes said tab.

6. The receiver box of claim 4 wherein said tab comprises at least a portion of one of said four segments.

7. The receiver box of claim 1 wherein said tab has an inner surface that aligns substantially flush with an inner surface of said tube.

8. The receiver box of claim 1 wherein said notch has a depth substantially equal to a thickness of said lip.

9. A trailer hitch receiver box comprising:
    a trailer hitch receiver tube adapted to receive a hitch bar and having a notch; and
    a lip mounted to said receiver tube, said lip having a tab positioned within said notch; wherein said lip is welded at an end of said tube.

10. A trailer hitch receiver box comprising:
    a trailer hitch receiver tube adapted to receive a hitch bar within a hitch bar receiving cavity; and
    a lip having four segments which define a lip opening to said hitch bar receiving cavity, said lip welded to said receiver tube about an end of said tube, said lip having a shoulder, said shoulder defining a bore therein, said bore in communication with said hitch bar receiving cavity, said tube includes a notch, said lip including a threaded bolt positioned within said bore and within said notch.

11. A trailer hitch receiver box comprising:
    a trailer hitch receiver tube adapted to receive a hitch bar and defining a notch therein; and
    a lip mounted to said receiver tube, said lip having a tab positioned within said notch; and where access to a hitch bar receiving cavity of said tube may be made through said notch; and
    where said tab includes a bore and where access to said receiving cavity may be made through said bore.

* * * * *